US012509062B2

(12) United States Patent
Sugiarto et al.

(10) Patent No.: US 12,509,062 B2
(45) Date of Patent: Dec. 30, 2025

(54) PARKING PATH SEARCH USING A MODIFIED PARKING PATH ALGORITHM

(71) Applicant: Aptiv Technologies AG, Schaffhausen (CH)

(72) Inventors: Tanto Sugiarto, West Lafayette, IN (US); Tapan R. Mujumdar, Canton, MI (US)

(73) Assignee: APTIV TECHNOLOGIES AG, Schaffhausen (CH)

( * ) Notice: Subject to any disclaimer, the term of this patent is extended or adjusted under 35 U.S.C. 154(b) by 285 days.

(21) Appl. No.: 18/188,422

(22) Filed: Mar. 22, 2023

(65) Prior Publication Data
US 2024/0317214 A1    Sep. 26, 2024

(51) Int. Cl.
*B60W 30/06*    (2006.01)
*G06T 7/70*    (2017.01)
*G08G 1/14*    (2006.01)

(52) U.S. Cl.
CPC ............... *B60W 30/06* (2013.01); *G06T 7/70* (2017.01); *G08G 1/143* (2013.01); *G06T 2207/30264* (2013.01)

(58) Field of Classification Search
CPC ...... B60W 30/06; B60W 30/10; B60W 30/12; G06T 2207/30264; B62D 15/0285
See application file for complete search history.

(56) References Cited

U.S. PATENT DOCUMENTS 6,038,509 A * 3/2000 Poppen .............. G01C 21/3446
701/417

6,147,971 A * 11/2000 Rochberger ............ H04L 45/10
370/255

(Continued)

FOREIGN PATENT DOCUMENTS

EP           3971041 A1     3/2022
WO    WO-2021180035 A1 *   9/2021  ........... G01S 15/931
WO    WO-2022007227 A1 *   1/2022  ......... B62D 15/0285

OTHER PUBLICATIONS

Wang H, Lou S, Jing J, Wang Y, Liu W, Liu T. The EBS-A* algorithm: An improved A* algorithm for path planning. PLoS One. Feb. 17, 2022;17(2):e0263841. doi: 10.1371/journal.pone.0263841. PMID: 35176092; PMCID: PMC8853577. (Year: 2022).*

(Continued)

*Primary Examiner* — Phutthiwat Wongwian
*Assistant Examiner* — Brian R Kirby
(74) *Attorney, Agent, or Firm* — Harness, Dickey & Pierce, P.L.C.

(57) ABSTRACT

This document describes techniques and systems for performing a parking path search using a modified parking path algorithm. An example parking system can obtain an initial pose and a goal pose of a host vehicle and an obstacle map for a parking environment. The parking system can then use a parking path algorithm to determine first waypoints for a parking path. In response to a number of run-time iterations being greater than a threshold, the parking system can select an intermediate source node closest to the goal pose. The parking path algorithm can then be used to determine second waypoints from the intermediate source node to the goal pose. The host vehicle can then be controlled to park using the first waypoints and the second waypoints. In this way, a parking path search is performed more efficiently, while still generating a path close to the globally-optimal solution.

20 Claims, 9 Drawing Sheets

(56) References Cited

U.S. PATENT DOCUMENTS

| | | | | |
|---|---|---|---|---|
| 7,574,686 | B1* | 8/2009 | Wadland | G06F 30/394 |
| | | | | 716/126 |
| 2002/0100009 | A1* | 7/2002 | Xing | G06F 30/394 |
| | | | | 716/131 |
| 2007/0027612 | A1* | 2/2007 | Barfoot | G05D 1/0297 |
| | | | | 701/25 |
| 2010/0156671 | A1* | 6/2010 | Lee | G08G 1/168 |
| | | | | 340/932.2 |
| 2012/0197492 | A1* | 8/2012 | Schneider | B62D 15/0285 |
| | | | | 701/41 |
| 2015/0307089 | A1* | 10/2015 | Vorobieva | B62D 15/027 |
| | | | | 701/25 |
| 2016/0313133 | A1* | 10/2016 | Zeng | B60W 60/0011 |
| 2017/0219353 | A1* | 8/2017 | Alesiani | G05D 1/0212 |
| 2017/0241790 | A1* | 8/2017 | Yoshikawa | G01C 21/3415 |
| 2018/0052460 | A1* | 2/2018 | Kurt | B62D 15/0285 |
| 2018/0297589 | A1* | 10/2018 | Hasejima | G08G 1/16 |
| 2020/0033857 | A1* | 1/2020 | Yu | H04W 4/38 |
| 2020/0232805 | A1* | 7/2020 | Takahashi | B60W 60/0011 |
| 2020/0278688 | A1* | 9/2020 | Sarkar | B62D 15/0285 |
| 2021/0020045 | A1 | 1/2021 | Huang et al. | |
| 2023/0157506 | A1* | 5/2023 | Tamino | G05D 1/0219 |
| | | | | 15/319 |

OTHER PUBLICATIONS

Extended European Search Report regarding Application No. 24162121.8 dated Aug. 19, 2024.

* cited by examiner

PARKING PATH SEARCH USING A MODIFIED PARKING PATH ALGORITHM

BACKGROUND

Some vehicles provide autonomous or automated parking to assist drivers. Parking path searching (e.g., a driving path to park in a particular space), however, is generally computationally expensive due to the large search space and restriction of the vehicle's motion to non-holonomic constraints. As a result, the computational time to perform a parking path search and select a particular maneuver can be too long for practical implementations in many parking scenarios.

SUMMARY

This document describes techniques and systems for performing a parking path search using a modified parking path algorithm. An example system includes a processor that can obtain an initial pose and a goal pose of a host vehicle and an obstacle map for a parking environment. The initial pose provides a source node for use in a parking path algorithm. The goal pose indicates a goal node for use in the parking path algorithm and indicates a parking pose of the host vehicle in a selected parking space. The parking system can then use a parking path algorithm and the obstacle map to determine first waypoints for a parking path from the source node toward the goal node. In response to a number of run-time iterations of the parking path algorithm being greater than a threshold, the parking system can select an intermediate source node that is closest to the goal node. The parking path algorithm can then be used to determine second waypoints for the parking path from the intermediate source node to the goal node. The host vehicle can then be controlled to park in the selected parking space using the first waypoints and the second waypoints as the parking path. In this way, the described system can perform a parking path search in a more computationally efficient manner, while still generating a parking path that is close to the globally-optimal solution.

This document also describes methods performed by the above-summarized system and other configurations set forth herein and computer-executable instructions and means for performing these methods.

This Summary introduces simplified concepts related to performing a parking path search using a modified parking path algorithm in the Detailed Description and Drawings. This Summary is not intended to identify essential features of the claimed subject matter, nor is it intended to determine the scope of the claimed subject matter.

BRIEF DESCRIPTION OF THE DRAWINGS

The details of one or more aspects of techniques and systems to perform a parking path search using a modified parking path algorithm are described in this document with reference to the following figures. The same numbers are often used throughout the drawings to reference similar features and components:

FIGS. 5-1 through 5-4 illustrate an example parking path search using a modified parking path algorithm.

DETAILED DESCRIPTION

Overview

Some vehicles provide autonomous or automated parking functionality. Many autonomous or automated parking systems use parking path algorithms to generate a parking path to park the host vehicle in a selected parking space. Parking path searching, however, is a complex task due to the relatively large search space around the selected parking space, non-holonomic constraints on vehicle motion (e.g., vehicles cannot directly move sideways, but must move forwards or backward in order to effect a sideways movement), and avoidance of nearby obstacles (e.g., parked vehicles and other objects).

Some parking systems use tailored algorithms specific to a parking scenario (e.g., perpendicular or angle parking). The generalization of these algorithms can be difficult to apply in many corner-case scenarios.

Other parking systems may use dynamic programming algorithms that break down the parking path search into smaller sub-searches in a recursive manner. In such approaches, the parking system represents the parking environment as a graph network. Each node in the graph network represents a potential vehicle pose (e.g., x position, y position, heading). The edges connecting two nodes represent potential maneuvers with respective costs. The goal of such dynamic programming algorithms is to find a parking path from the initial pose of the host vehicle to the goal pose (e.g., parked position in the selected parking space) with a minimum accumulated cost.

Many dynamic programming algorithms have been developed. One such implementation is a variant of the Dijkstra-based algorithm called Hybrid A*. The Hybrid A* algorithm incorporates non-holonomic constraints for node expansion and also includes a heuristic cost function that represents the cost from a potential intermediate node to the goal pose. In applying Hybrid A* to real-world parking scenarios, the computational time greatly increases as the number of intermediate nodes explored increases. Using the heuristic cost function can reduce the number of explored nodes, but the resulting computational time is still not sufficient in many corner cases. For example, in parallel parking scenarios, as the parking path search gets closer to the goal node, the optimal solution may not be quickly found because there are too many intermediate nodes that are close to the goal node that must each be explored.

In contrast, this document describes techniques and systems to perform a parking path search using a modified parking path algorithm. The described techniques and system mitigate the computational expense with the parking path algorithm (e.g., Hybrid A* algorithm) in various corner cases to improve the computational time for parking path searches. For example, a parking system can obtain an initial pose (e.g., the source node), a goal pose (e.g., the goal node), and an obstacle map for the parking environment. The parking system can then use a parking path algorithm and the obstacle map to determine first waypoints for a parking path from the source node toward the goal node. In response to a number of run-time iterations of the parking path algorithm being greater than an iteration threshold, the parking system can select an intermediate source node that is closest to the goal pose. The parking path algorithm can then be used to determine second waypoints for a parking path from the intermediate source node to the goal node. The host vehicle can then be controlled to park in the selected parking space using the first waypoints and the second waypoints as the parking path. In this way, the described techniques and systems balance global optimality and computational time for the parking path search. Although the described parking system does not find the most optimal parking path, the parking path generated is close to the globally optimal solution because the parking path algorithm is initially run until it is near the goal node.

This is just one example of the described techniques and systems for performing a parking path search using a modified Dijkstra algorithm. This document describes other examples and implementations.

Operating Environment

Figure 1:
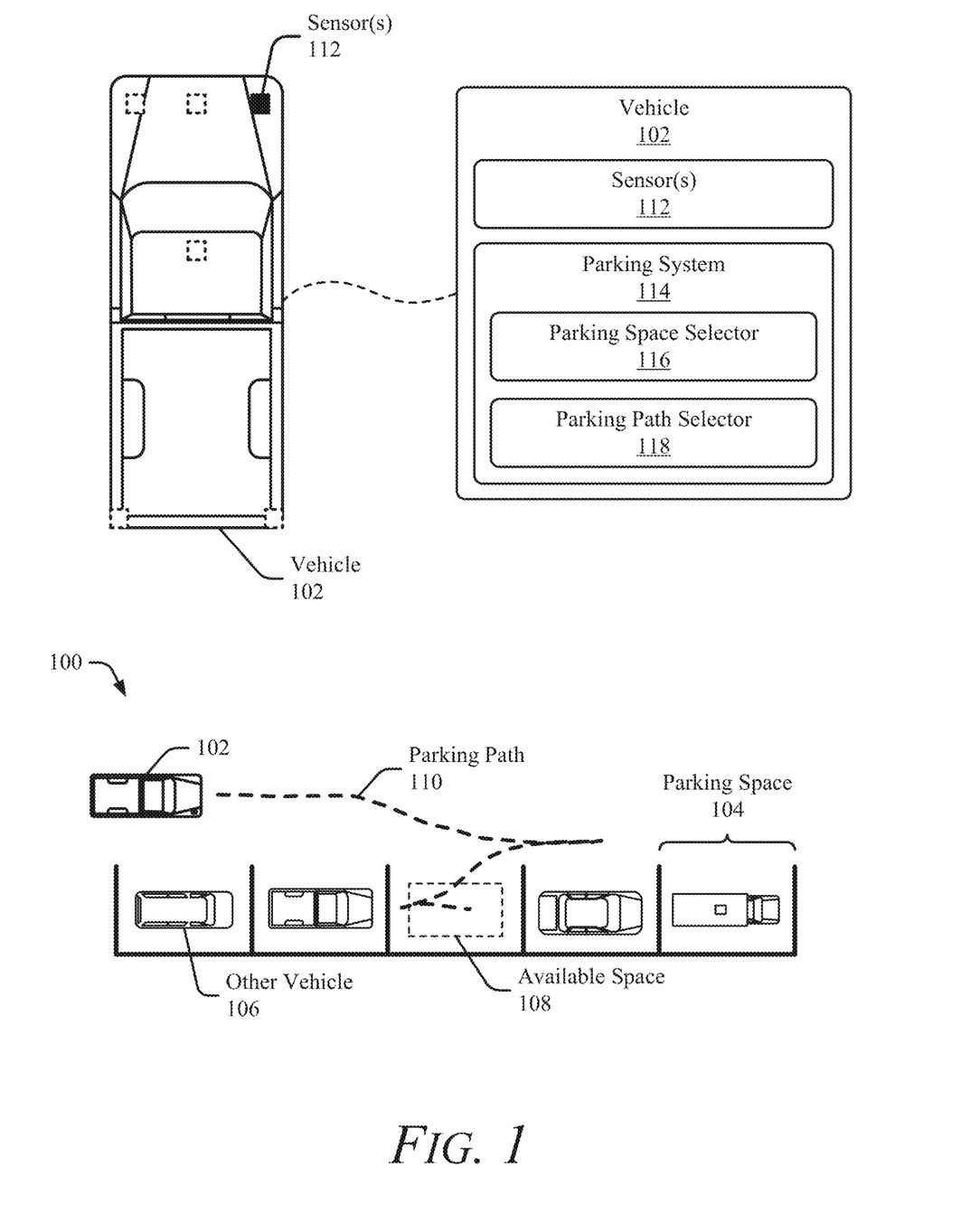
FIG. 1 illustrates an example environment in which a parking system can perform a parking path search using a modified parking path algorithm in accordance with the techniques of this disclosure.

FIG. 1 illustrates an example environment 100 in which a parking system 114 of a vehicle 102 (e.g., a host vehicle) can perform a parking path search space using a modified parking path algorithm in accordance with techniques of this disclosure. In the depicted environment 100, the vehicle 102 is in a parking lot or other environment that includes multiple parking spaces 104. The parking spaces 104 are illustrated in FIG. 1 as being parallel to the travel path of the vehicle 102. In other implementations, the parking spaces 104 may be at an angle or perpendicular to the travel path of the vehicle 102. The environment 100 includes other vehicles 106 parked in some of the parking spaces 104. Environment 100 also includes an available space 108.

Although illustrated as a passenger truck, the vehicle 102 can represent other types of motorized vehicles (e.g., a car, an automobile, a motorcycle, a bus, a tractor, a semi-trailer truck), watercraft (e.g., a boat), or aircraft (e.g., an airplane). Similarly, the other vehicles 106 can be other types of motorized vehicles, watercraft, aircraft, or other objects located in the parking spaces 104 (e.g., dumpsters, shopping carts).

The vehicle 102 includes one or more sensors 112 and the parking system 114. In the depicted environment 100, the sensors 112 are mounted to, or integrated within, front, central, and rear portions of the vehicle 102. As described in greater detail below, the sensors 112 may include camera systems, radar systems, lidar systems, or ultrasonic systems. The sensors 112 can provide sensor data regarding the parking spaces 104, the other vehicles 106, and the available spaces 108 to the parking system 114. In addition, the parking system 114 or another component of the vehicle 102 can use the sensors 112 to obtain an initial pose of the vehicle 102, a goal pose of the vehicle 102 to park in an available space 108 or selected parking space, and an obstacle map for the environment 100 that includes the other vehicles 106 and other obstacles.

In the depicted implementation, the sensors 112 are mounted on the front of the vehicle 102 and may provide parking-space characteristics for the available spaces 108. The sensors 112 can detect the parking-space characteristics from any exterior surface of the vehicle 102. For example, vehicle manufacturers can integrate a radar system, a lidar system, a camera, or an ultrasonic sensor into a bumper, side mirror, headlights, or any other interior or exterior location where objects and parking spaces 104, other vehicles 106, and other obstacles require detection. In some cases, vehicle 102 includes multiple sensors and/or sensor types, such as a radar system and a camera, that provide a larger instrument field of view or improved detection of different parking-space characteristics. In general, vehicle manufacturers can design the locations of the sensors 112 to provide a particular field of view that encompasses a region of interest. Example fields of view include a 180-degree Field of view, one or more 90-degree Fields of view, and so forth, which can overlap or be combined into a field of view of a particular size.

The parking system 114 may provide assisted or autonomous parking to a driver of the vehicle 102. For example, the parking system 114 can identify a selected parking space (e.g., an optimal parking space) and a parking path 110. As another example, the parking system 114 can provide input to an assisted-driving or autonomous-driving system to park the vehicle 102 in one of the available spaces 108.

The parking system 114 can include a parking space selector 116 and parking path selector 118. The parking system 114, the parking space selector 116, and the parking path selector 118 can be implemented using hardware, software, firmware, or a combination thereof. The parking space selector 116 can identify the available spaces 108 and select a parking space among the available spaces 108 for the vehicle 102. In this way, the parking space selector 116 can select a parking space in crowded parking lots and allow the vehicle 102 to perform a more-natural and a more-practical parking path. In other implementations, the driver can provide input to the parking system 114 to select a desired parking space. The parking path selector 118 can determine a maneuver type (e.g., front-in parking, back-in parking, single-turn maneuver, two-turn maneuver) and the parking path 110 for parking the vehicle 102 in the selected parking space. The parking path selector 118 may use a modified Dijkstra algorithm (e.g., a variant of the Hybrid A* algorithm) to determine the parking path for the vehicle 102 to park in the available space 108. In other implementations, the parking path selector 118 may use another Dijkstra variant, including A*, Anytime A*, D*, or D* Lite. The modified Dijkstra algorithm may be tuned to determine the parking path 110 that is near the most-optimal parking path but in a computationally-efficient manner.

Vehicle Configuration

Figure 2:
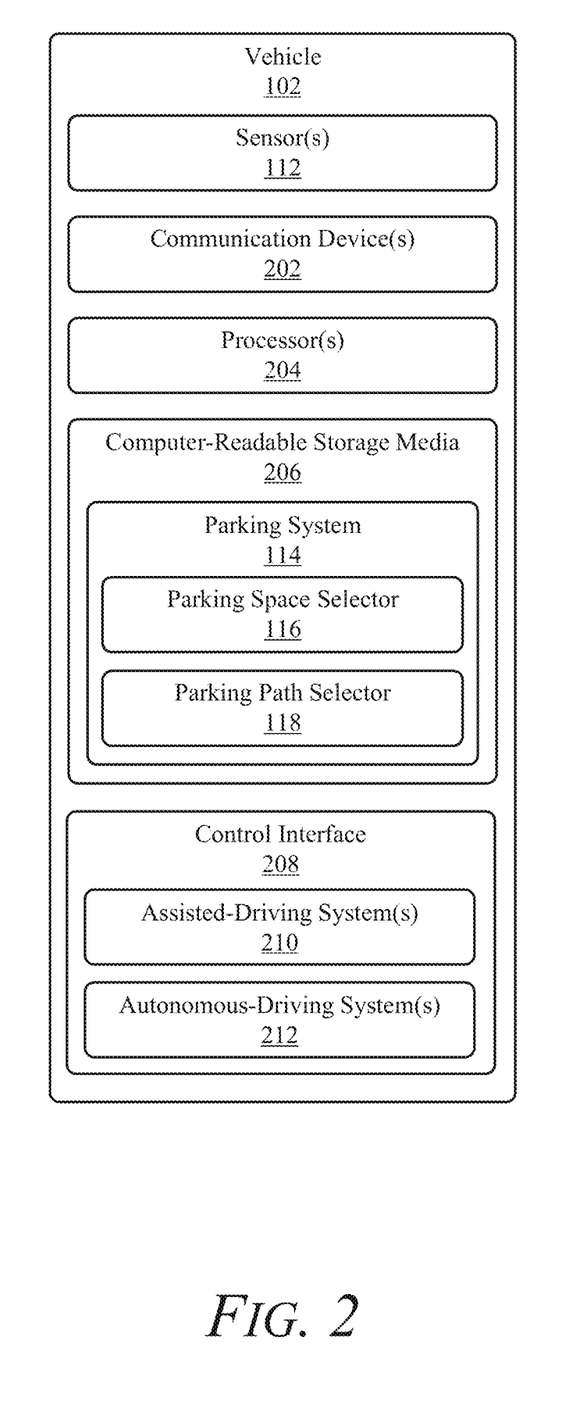
FIG. 2 illustrates an example configuration of a vehicle with a parking system that can perform a parking path search using a modified parking path algorithm.

FIG. 2 illustrates an example configuration of the vehicle 102 with the parking system 114 that can perform a parking path search using a modified Dijkstra algorithm. As described in FIG. 1, the vehicle 102 includes the sensors 112 and the parking system 114, which includes the parking space selector 116 and the parking path selector 118. In addition, the vehicle 102 can include one or more communication devices 202, one or more processors 204, computer-readable storage media (CRM) 206, and a control interface 208 to one or more vehicle-based systems, including one or more assisted-driving systems 210 and one or more autonomous-driving system 212.

The communication devices 202 can include a sensor interface and a vehicle-based system interface. The sensor interface and the vehicle-based system interface can transmit data (e.g., radar data, range computations, and other parking-space characteristics associated with the available spaces 108) over a communication bus of the vehicle 102, for example, when the individual components of the sensors 112 and/or the parking system 114 are integrated within the vehicle 102.

The processors 204 (e.g., an energy processing unit or electronic control unit) can be a microprocessor or a system-on-chip. The processors 204 can execute instructions stored in the CRM 206, on one or more disks, memories, or other non-transitory computer-readable storage media. For example, the processors 204 can process sensor data from the sensors 112 and execute instructions loaded from the CRM 206 to cause the processors 204 to determine the parking path 110 for a selected parking space. The instructions may cause the processor 204 to be configured to select a parking space using the parking system 114 and/or generate a parking maneuver, including the maneuver type and the parking path 110, for at least one automotive system. For example, the processors 204 can execute the instructions on the CRM 206 to configure the processors 204 to control, based on sensor data, an autonomous or semi-autonomous driving system of the vehicle 102 to cause the vehicle 102 to park in a selected parking space using the parking path 110.

The parking system 114 can be stored in the CRM 206. As described in FIG. 1, the parking system 114 can include the parking space selector 116 and parking path selector 118. The parking space selector 116 can identify the available spaces 108 and select a parking space (e.g., an optimal parking space) for the vehicle 102. The selected parking space can be presented to the driver of vehicle 102 on a display (e.g., an overlay on a photographic or video feed of the parking environment or a graphical representation of the parking environment). The driver can then navigate and park in the selected parking space. The driver can also provide an input (e.g., via voice or touch input) to the parking system 114 to have the assisted-driving system 210 or the autonomous-driving system 212 perform the parking maneuver. The parking space selector 116 may also determine nearby available spaces 108 and present them on a video display to the driver of vehicle 102. The driver may then select the available space 108 into which the parking path selector 118 determines the parking path 110.

The parking path selector 118 may determine a maneuver type (e.g., front-in parking, back-in parking, single-turn maneuver, two-turn maneuver) for parking in the selected parking space. For example, the parking path selector 118 can determine, based on the parking-space characteristics, that the vehicle 102 is unable to perform a single-turn maneuver into the selected parking space because the entry turning radius is smaller than the minimum inner turning radius of vehicle 102. The parking path selector 118 may also determine, based on driver preferences or input, to perform a single—or two-turn maneuver followed by a back-in movement to park in the selected parking space.

The parking path selector 118 determines the parking path 110 for parking in the selected parking space. As described in greater detail below, the parking path selector 118 can determine a series of waypoints for the parking path 110 to safely park the vehicle 102. In some implementations, the parking path selector 118 may output a suggested maneuver path to a display for the driver to follow for entry into the selected parking space. In this way, the parking path selector 118 can control the vehicle 102 to perform parking maneuvers, especially for crowded or congested parking lots.

The vehicle 102 also includes the control interface 208 to one or more vehicle-based systems, which individually or in combination provide a way for receiving a parking-space selection and parking path to control the vehicle 102. Some examples of vehicle-based systems to which the control interface 208 supplies parking information include the assisted-driving system 210 and the autonomous-driving system 212; each may rely on information output from the parking system 114.

For example, the vehicle-based systems may rely on data, which is communicated via the communication devices 202 and obtained from the sensors 112, to operate the vehicle 102 (e.g., performing a single-turn or two-turn parking maneuver). Generally, the control interface 208 can use data provided by the parking system 114 and/or sensors 112 to control operations of the vehicle 102 to park in selected parking spaces using the parking path 110. The assisted-driving system 210 can alert a driver of a selected parking space via a display and/or perform a parking maneuver into the selected parking space. As another example, the autonomous-driving system 212 can navigate the vehicle 102 to park in the selected parking space using the parking path 110.

Example Method

Figure 3:
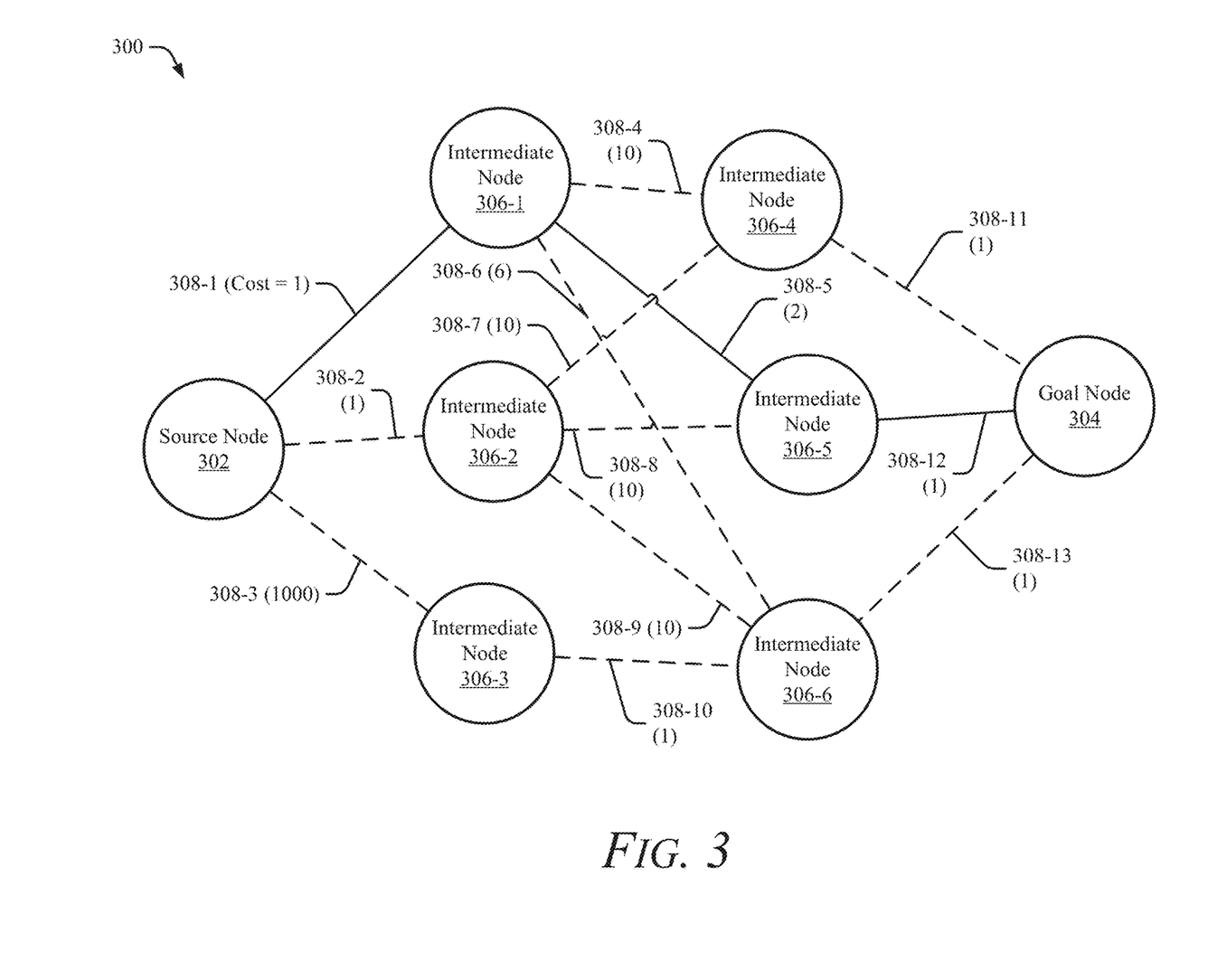
FIG. 3 illustrates a graph network representation of a parking environment for performing a parking path search using a modified parking path algorithm.

FIG. 3 illustrates a graph network 300 that represents a parking environment (e.g., the environment 100 of FIG. 1) for performing a parking path search using a modified Dijkstra algorithm. The parking system 114 or the parking path selector 118 can analyze the parking environment to generate the graph network 300 and, in particular, to determine the parking path 110 for a selected parking space.

The graph network 300 includes a source node 302, a goal node 304, and multiple intermediate nodes 306. The source node 302 represents an initial pose of vehicle 102 at the beginning of the parking path. In other words, the source node 302 may represent the current pose (e.g., position and heading) of the vehicle 102. The goal node 304 represents the final parking pose of the vehicle 102 in the selected parking space at the end of the parking path. In other words, the goal node 304 can represent the final pose (e.g., position and heading) of the vehicle 102 once it is parked in the selected parking space. The source node 302 can be obtained from a vehicle state estimator of vehicle 102. The goal node 304 can be obtained from the parking space selector 116.

The intermediate nodes 306 (e.g., intermediate node 306-1, 306-2, 306-3, 306-4, 306-5, and 306-6) represent potential intermediate poses of vehicle 102 along the parking path 110. The parking system 114 or the parking path selector 118 can identify the intermediate nodes 306 as it runs its parking path algorithm using an obstacle map of the parking environment obtained from a perception system of vehicle 102.

Each node (e.g., the source node 302, the goal node 304, and the intermediate nodes 306) represents an actual or potential location (e.g., with Cartesian or polar coordinates) and a heading of vehicle 102. The location can be expressed in a vehicle coordinate system or a global coordinate system.

The graph network 300 also includes edges 308 that connect two nodes from among the source node 302, the goal node 304, and the intermediate nodes 306. The edges 308 represent potential maneuvers that the vehicle 102 can perform between two nodes subject to the non-holonomic constraints of vehicle 102. Each edge 308 is weighted by a respective cost of the potential maneuver (as shown by the number value in parenthesis in FIG. 3). The parking path selector 118 can assign the weights based on the steering angle required to reach the second node, the proximity of the nodes and the edge to obstacles in the obstacle map, whether a change of direction is required (e.g., from forward driving to reverse), and the change in the steering angle to travel along the edge. The goal of the parking path selector 118 is to find a parking path from the source node 302 to the goal node 304 with the minimum accumulated cost. In the example graph network 300, this parking path is represented by the solid line that includes the source node 302, the intermediate node 306-1, the intermediate node 306-5, and the goal node 304. The selected parking path also includes the edge 308-1 (with a cost of 1), the edge 308-5 (with a cost of 2), and the edge 308-12 (with a cost of 1).

In running the parking path algorithm, the parking path selector 118 initially places the source node 302 into a priority queue. The priority queue acts as a storage or memory of nodes visited in the parking path search. The parking path selector 118 then pops or removes the source node 302 from the priority queue and expands the source node 302 to neighboring intermediate nodes, which include the intermediate nodes 306-1, 306-2, and 306-3 in the graph network 300. The neighboring intermediate nodes 306-1, 306-2, and 306-3 are stored in the priority queue. The parking path selector 118 also obtains or determines costs associated with the edge between the source node 302 and each intermediate node. For example, the associated costs 308-1, 308-2, and 308-3 for the edge between the source node 302 and the intermediate nodes 306-1, 306-2, and 306-3, respectively, are one (1), one (1), and one thousand (1000), respectively.

The parking path selector 118 then proceeds with the intermediate nodes 306-1 and 306-2 because they have much lower associated costs. The parking path selector 118 can first pop or remove the intermediate node 306-2 from the priority queue and expand it to its neighboring intermediate nodes, which include the intermediate nodes 306-4, 306-5, and 306-6 in the graph network 300. The neighboring intermediate nodes 306-4, 306-5, and 306-6 are stored in the priority queue. The parking path selector 118 also obtains or determines costs associated with the edge between the intermediate node 308-2 and each neighboring intermediate node. For example, the associated costs 308-7, 308-8, and 308-9 for the edge between the intermediate node 306-2 and the intermediate nodes 306-4, 306-5, and 306-6, respectively, are ten (10), ten (10), and ten (10), respectively. The parking path selector 118 also updates the total path cost to the neighboring nodes (e.g., from the source node 302 to the intermediate nodes 306-4, 306-5, and 306-6 via the intermediate node 306-2) to be eleven (11) for each potential path.

The parking path selector 118 can then pop or remove the intermediate node 306-1 from the priority queue and expand it to its neighboring intermediate nodes, which include the intermediate nodes 306-4, 306-5, and 306-6 in the graph network 300. The parking path selector 118 also obtains or determines costs associated with the edge between the intermediate node 306-1 and each neighboring intermediate node. For example, the associated costs 308-4, 308-5, and 308-6 for the edge between the intermediate node 308-1 and the intermediate nodes 306-4, 306-5, and 306-6, respectively, are ten (10), two (2), and six (6), respectively. The parking path selector 118 also updates the total path cost to the neighboring nodes (e.g., from the source node 302 to the intermediate nodes 306-4, 306-5, and 306-6 via the intermediate node 306-1) to be eleven (11), three (3), and seven (7), respectively, for each potential path.

The parking path selector 118 then proceeds with the intermediate node 306-5 because it is associated with the current path with the lowest associated total cost. The parking path selector 118 can pop or remove the intermediate node 306-5 from the priority queue, which currently includes the intermediate nodes 306-3, 306-4, and 306-6. The intermediate node 306-5 can be expanded to its neighboring nodes, which is the goal node 304. The parking path selector 118 also obtains or determines the cost associated with the edge between the intermediate node 306-5 and the goal node 304, which has a cost of one (1). The parking path selector 118 has thus found the optimal parking path as including the following waypoints: the source node 302, the intermediate nodes 306-1 and 306-5, and the goal node. The cost associated with the optimal parking path is four (4).

Figure 4:
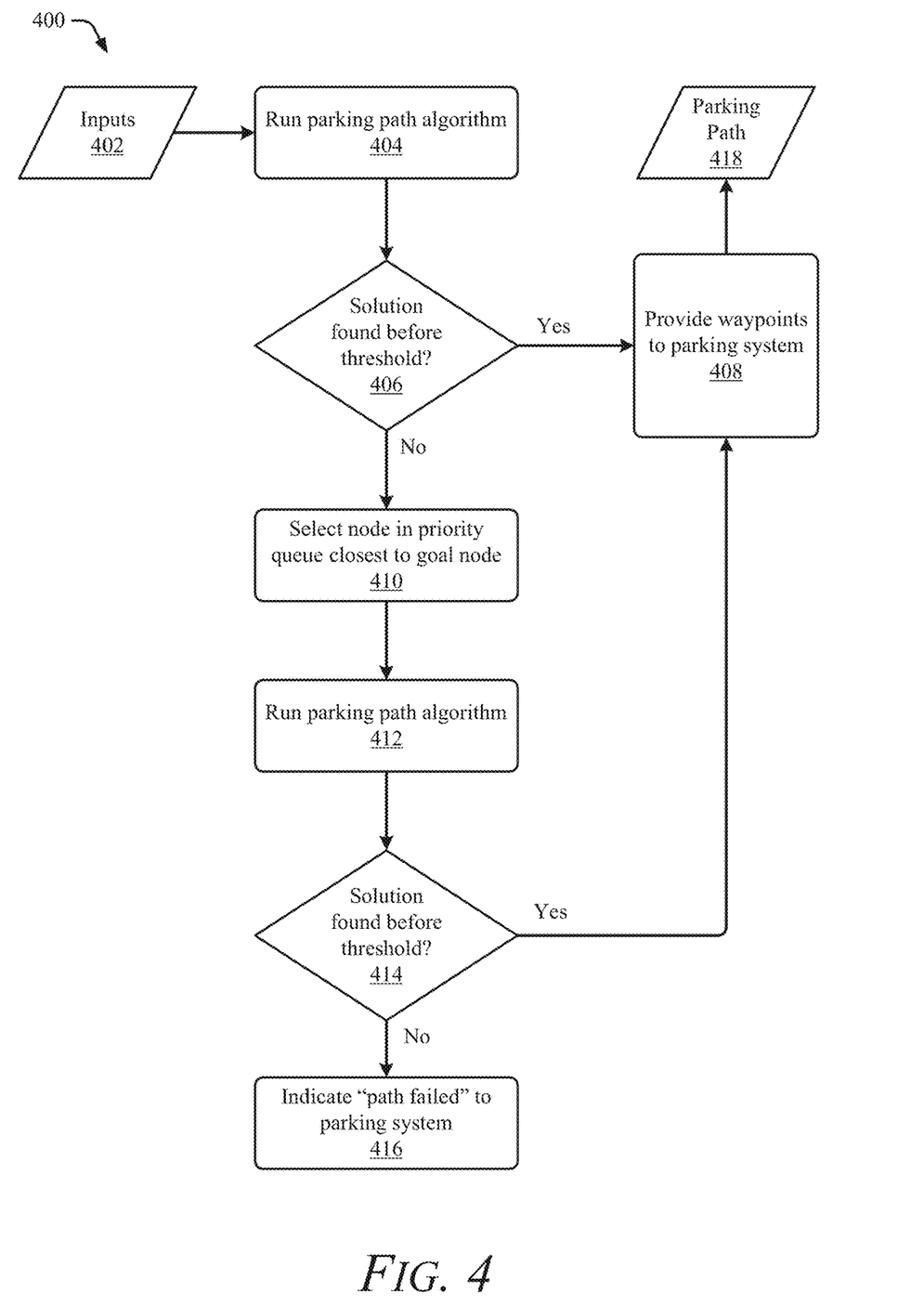
FIG. 4 illustrates an example flowchart of the described techniques and systems to perform a parking path search using a modified parking path algorithm.

FIG. 4 illustrates an example flowchart 400 of the described techniques and systems to perform a parking path search using a modified parking path algorithm. The parking system of FIG. 4 can, for example, be the parking system 114 and/or the parking path selector 118 of FIGS. 1 and 2. The output of the flowchart 400 is a parking path 418. The parking path 418 can be displayed to the driver of vehicle 102 and/or provided as input to the assisted-driving system 210 or the autonomous-driving system 212 to operate vehicle 102 along the parking path 418 to park the vehicle 102 in the selected parking space.

At step 404, the parking system 114 or the parking path selector 118 obtains inputs 402 and runs a parking path algorithm. The inputs 402 include an initial or current pose of the vehicle 102, a goal pose for a selected parking space, and an obstacle map. The initial pose represents the source node 302 for the parking path algorithm and can be obtained from a vehicle state estimator that uses location data to determine the vehicle's location. The goal pose represents the goal node 304 for the parking path algorithm and can be obtained from the parking space selector 116. The parking system 114 can also obtain the obstacle map for the environment near or around the initial pose and the goal pose. The obstacle map can be obtained from a perception system that uses sensor data to generate and populate the obstacle map. In some implementations, the obstacle map can be a radar occupancy grid map generated from radar data or a similar type of occupancy grid map (e.g., an occupancy grid map that fuses data from multiple types of sensors).

The parking path selector 118 determines first waypoints for the parking path by using the parking path algorithm and the obstacle map. The first waypoints include a series of positional nodes (e.g., providing both a pose and a heading of vehicle 102) for navigating the vehicle 102 from the source node 302 toward the goal node 304.

At step 406, the parking path selector 118 determines whether a solution for the parking path has been found before a threshold. Instead of running the parking path algorithm until the goal node 304 is reached, the parking path selector 118 can run for a set number of iterations or until it reaches an intermediate node 306 within a set proximity of the goal node 304 in order to improve the computational time to find the parking path 418. For example, the parking path selector 118 can monitor a number of run-time iterations of the parking path algorithm. The threshold can be a predetermined number of run-time iterations that is empirically determined for each type of parking maneuver (e.g., parallel parking versus front-end angle parking). For example, the iteration threshold can be set at 150,000 iterations for a parallel parking maneuver. In other implementations, the threshold can be based on whether an intermediate node in the priority queue is within an absolute or relative distance of the goal node 304. For example, the iteration threshold can be set at two (2) meters for a parallel parking maneuver.

At step 408, if the parking path solution has been found before the threshold, the parking path selector 118 can provide the first waypoints to the parking system 114. In this scenario, the first waypoints provide the parking path 418 from the source node 302 to the goal node 304.

At step 410, if the parking path solution has not been found before the threshold, the parking path selector 118 selects the intermediate node 306 in the priority queue that is closest to the goal node 304. The selected intermediate node can be determined based on a Euclidean distance comparison. In other implementations, the selected intermediate node is one with a heading aligned with the heading of the goal node 304 and the smallest relative positional offset.

At step 412, the parking path selector 118 runs the parking path algorithm again with the selected intermediate node as an intermediate source node. In other words, the selected intermediate node is used as the starting point for a second run of the parking path algorithm with the goal node 304 remains the same. The parking path selector 118 determines second waypoints for the parking path from the intermediate source node to the goal node 304.

At step 414, the parking path selector 118 determines whether a solution for the parking path has been found before a second threshold. The second threshold can be the same as or different than the threshold in step 406. Like the previous threshold, the second threshold can be a predetermined number of run-time iterations that are empirically determined for each type of parking maneuver (e.g., parallel parking versus front-end angle parking). For example, the second threshold can be set at 1,000 iterations for a parallel parking maneuver.

At step 408, if the parking path solution has been found before the second threshold, the parking path selector 118 provides the second waypoints to the parking system 114. The second waypoints are appended to the first waypoints generated from the first run of the parking path algorithm to generate the parking path 418. In this way, the parking path selector 118 balances the global optimality of the parking path 418 with computational time. Although parking path 418 may not be the optimal parking path, the parking path 418 is close to the globally optimal solution because the parking path algorithm is initially run until it is near goal node 304.

At step 416, if the parking path solution has not been found before the second threshold, the parking path selector 118 determines a parking path solution cannot be found and provides a "path failed" message or indication to the parking system 114.

FIGS. 5-1 through 5-4 illustrate an example parking path search using a modified Dijkstra algorithm. The parking path search can be executed by the parking system 114 or parking path selector 118 of FIGS. 1 and 2 using the techniques described with respect to FIG. 4.

Figure 51:
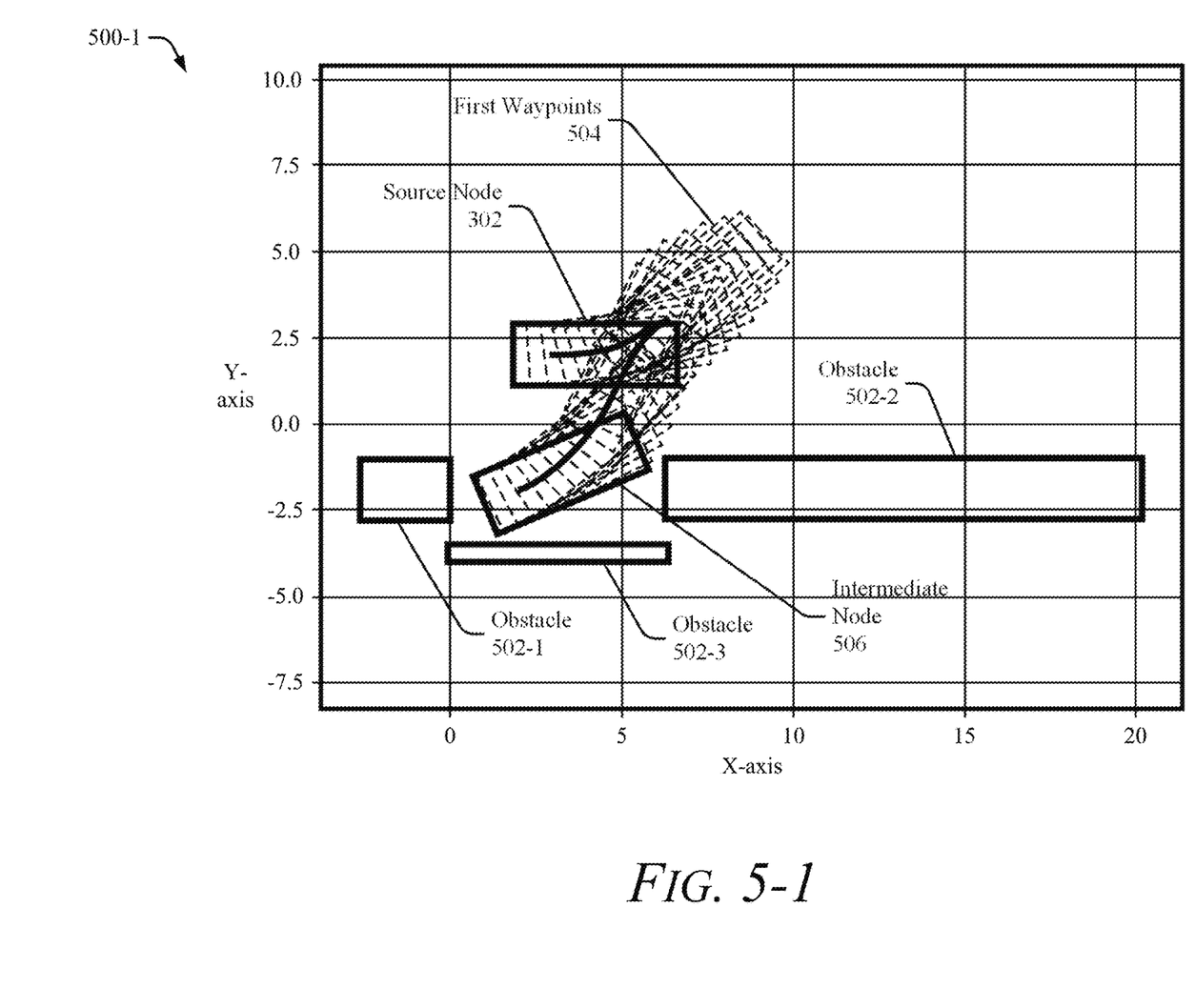

In FIG. 5-1, graph 500-1 illustrates the first waypoints determined by the parking path selector 118. The source node 302 or initial pose of the vehicle is (3, 2, 0) indicating that the center of vehicle 102 is located at an x-coordinate value of 3 and a y-coordinate value of 2 with a 0 heading (e.g., facing right along the x-axis). Although not illustrated in graph 500-1, the goal node is (2.2, −2, 0). The parking environment includes obstacles 502-1, 502-2, and 502-3. For example, the obstacles 502-1 and 502-2 can be other parked vehicles and the obstacle 502-3 can be a curb. The first waypoints 504 of the parking path are illustrated as a series of rectangular bounding boxes. After one hundred fifty thousand (150,000) iterations, the parking path selector 118 selects the intermediate node 506 as the positional node in the priority queue closest to the goal node 304. In this example, the iterations threshold is set at 150,000 iterations.

Figure 52:
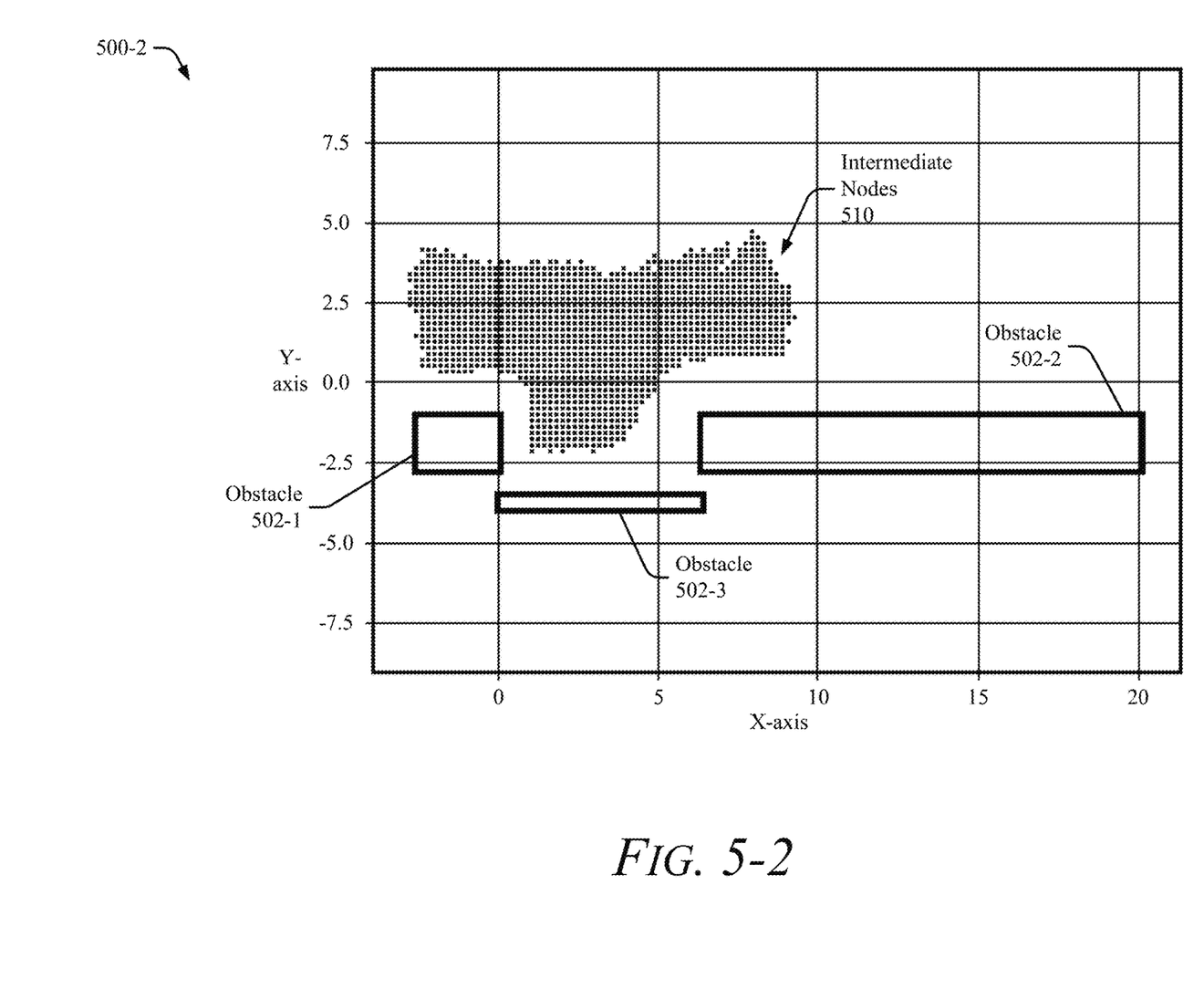

In FIG. 5-2, graph 500-2 illustrates the intermediate nodes 510, which are represented by dots, explored by the parking path selector 118 in running the parking path algorithm up to the iteration threshold. As illustrated by graph 500-2, the parking path selector 118 considers a large number of intermediate nodes 508 in searching for the parking path in the first run of the parking path algorithm.

Figure 53:
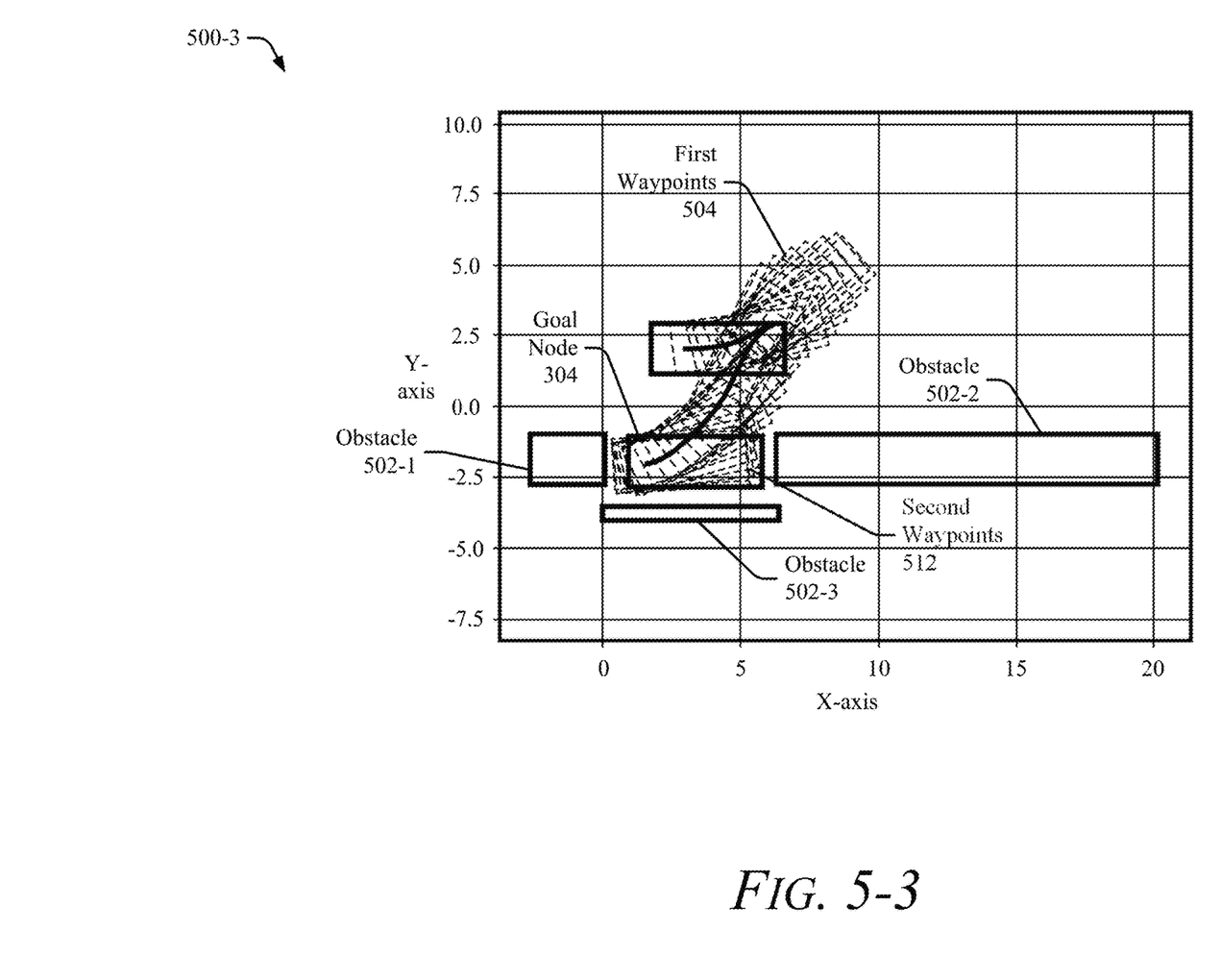

In FIG. 5-3, graph 500-3 illustrates the first waypoints and the second waypoints determined by the parking path selector 118. In running the parking path algorithm again from the intermediate node 506, the parking path selector 118 only runs an additional nine iterations to complete the path search to the goal node 304. The parking path is illustrated in graph 500-3 as a combination of the first waypoints 504 and the second waypoints 512. In contrast, the parking path selector 118 takes about one hundred seventy-five thousand (175,000) iterations to converge on the parking path solution without stopping at the iteration threshold, selecting the intermediate node 506, and running the parking path algorithm again from that node.

Figure 54:
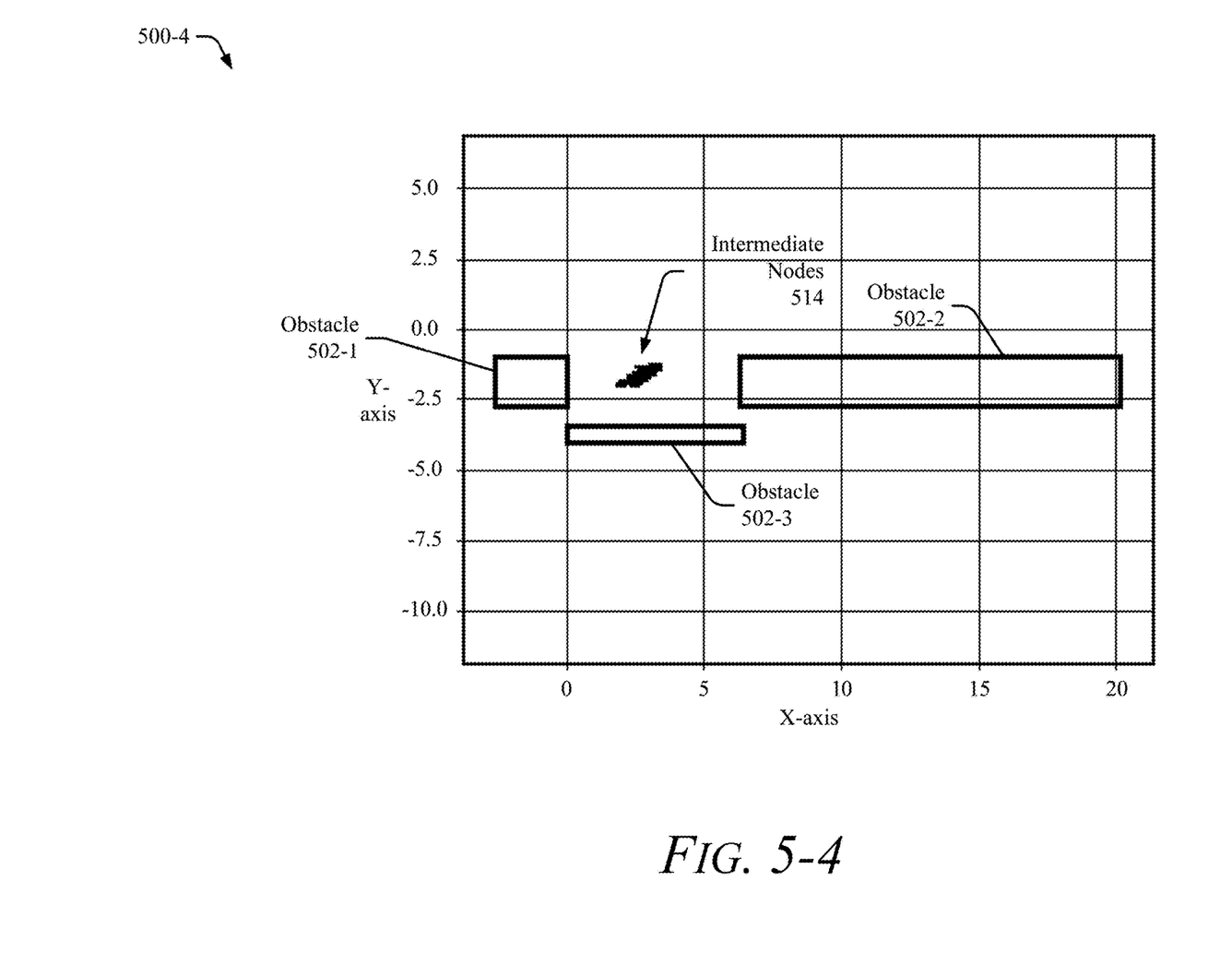

In FIG. 5-4, graph 500-4 illustrates the intermediate nodes 514, which are represented by dots, explored by the parking path selector 118 in running the parking path algorithm again from the intermediate node 506. As illustrated by graph 500-4, the parking path selector 118 considers a relatively small number of intermediate nodes 514 in searching for the second waypoints allowing it to converge on the parking path solution in far fewer operations than would otherwise be possible.

Figure 6:
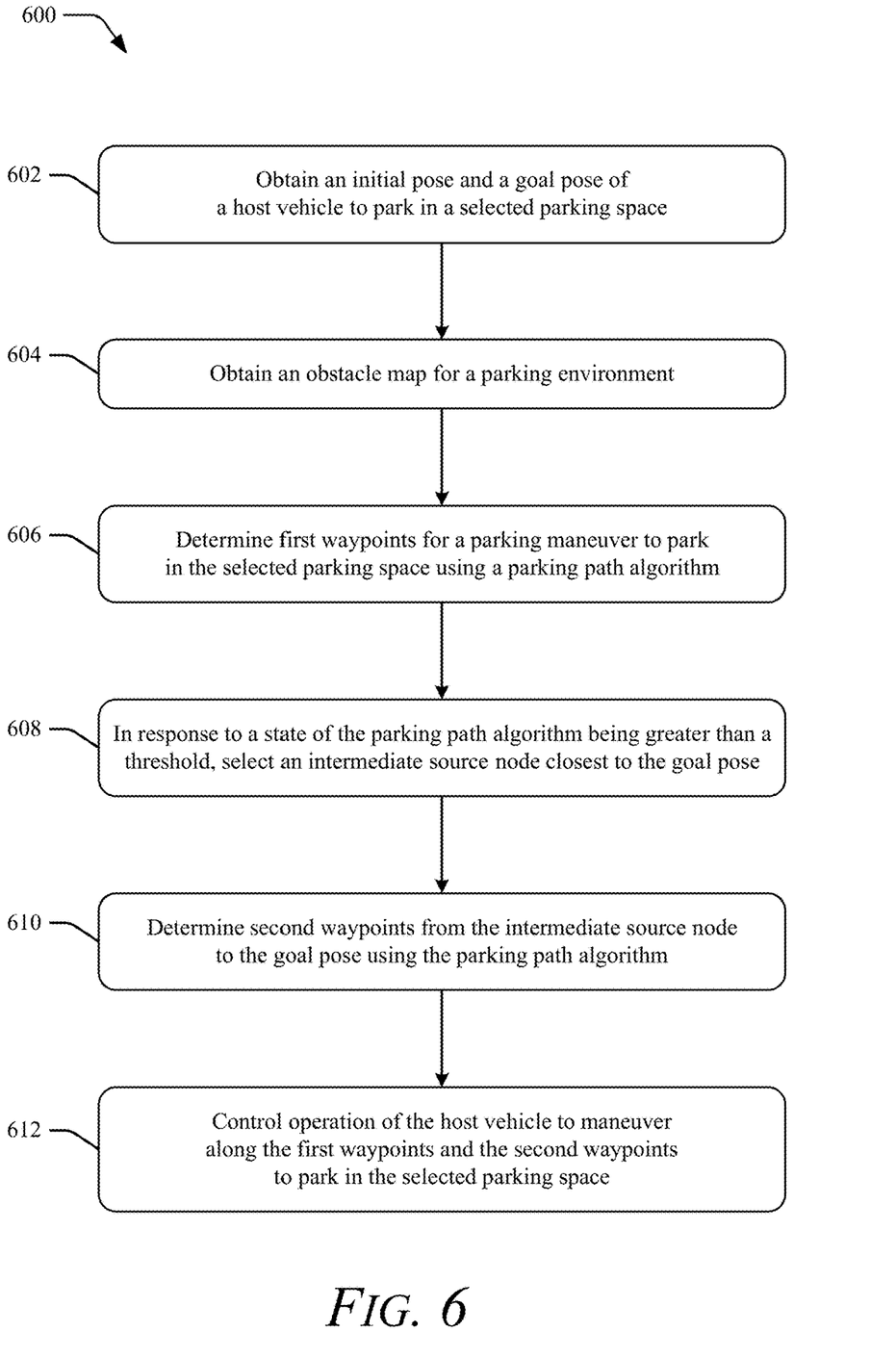
FIG. 6 illustrates an example method of a parking system to perform a parking path search using a modified parking path algorithm.

FIG. 6 illustrates an example method 600 of a parking system to perform a parking path search using a modified parking path algorithm. Method 600 is shown as operations (or acts) performed, but not necessarily limited to the order or combinations in which the operations are shown herein. Further, any one of one or more of the operations may be repeated, combined, or reorganized to provide other methods. In portions of the following discussion, reference may be made to environment 100 of FIG. 1, and entities detailed in FIGS. 1 through 5-4, reference to which is made for example only. The techniques are not limited to performance by one entity or multiple entities.

At step 602, an initial pose and a goal pose of a host vehicle are obtained. For example, the parking path selector 118 can obtain the initial pose of vehicle 102 from a vehicle state estimator. The initial pose can be determined using location data. As described with respect to FIG. 3, the initial pose represents the source node 302 used in a parking path algorithm. As described with respect to FIG. 3, the parking path selector 118 can also obtain the goal pose from the parking space selector 116. The goal pose represents the goal node 304 used in the parking path algorithm and indicates a parking pose of vehicle 102 in a selected parking space. The goal pose can be determined using location data, map data, or other sensor data (e.g., data from a camera system, a radar system, a lidar system, or an ultrasonic sensor system).

The parking path selector 118 can use a variety of parking path algorithms. For example, the parking path algorithm can be a variant of a Dijkstra-based algorithm for finding an optimal path from the source node to the goal node using non-holonomic constraints for movement of the vehicle 102. In one implementation, the Dijkstra-based variant is a Hybrid A star (A*) algorithm.

At step 604, an obstacle map for an environment near the initial pose and the goal pose is obtained. For example, the parking path selector 118 can obtain the obstacle map from a perception system. The obstacle map can be a radar occupancy grid map or a radar-centric occupancy grid map for the environment 100. In one implementation, the parking space selector 116 can determine the selected parking space from user input on a display in the vehicle 102. In another implementation, the parking space selector 116 can determine the selected parking space based on parking-space characteristics included in or derived from the obstacle map.

Using the sensors 112, the parking system 114 or the parking space selector 116 can determine parking-space characteristics associated with the available spaces 108. The parking-space characteristics can include a width, an entry turning radius, and a longitudinal distance. The parking space selector 116 can measure the width associated with an available space 108 as approximately the distance between the other vehicles 106 parked in the adjacent parking spaces. If another vehicle 106 is not parked in an adjacent parking space, then the parking system can use a predetermined distance offset from the parking-space line as an endpoint for measuring the width. The entry turning radius represents the radius of the travel path to enter the available space 108 from the current lateral position of the vehicle 102. The longitudinal distance can represent the distance from the front of the vehicle 102 to the lateral center of available space 108. The goal pose can be defined to place the vehicle 102 in the longitudinal center and the lateral center of the available space 108.

The parking system 114 or the parking space selector 116 can also determine other parking-space characteristics associated with the available spaces 108. For example, a lateral distance can be determined that indicates the distance between another vehicle 106 in an adjacent parking space and the vehicle 102. The parking system 114 can also determine a space depth (e.g., a longitudinal depth of each available space 108), space type (e.g., handicapped, compact car, reserved, electric-vehicle only, autonomous-only), neighboring vehicle classification, and shading classification. The neighboring vehicle classification can identify the type of vehicles in adjacent parking spaces (e.g., luxury or expensive vehicles, compact vehicles). The shading classification can identify whether any shade is currently available or will be available during an expected parking duration. The parking system 114 can also consider other characteristics (e.g., distance to a building associated with the parking lot or a programmed destination, distance from parking lot entrance or exit, parking-space slope). The parking space selector 116 can use the parking-space characteristics to determine a selected parking space among multiple available spaces 108. Similarly, the parking path selector 118 can use the parking-space characteristics to determine the parking path for controlling the operation of the vehicle 102 to park within the selected parking space.

At step 606, first waypoints for the parking path are determined using the parking path algorithm and the obstacle map. For example, the parking path selector 118 initially runs the parking path algorithm to obtain a series of positional nodes (e.g., the first waypoints) for the parking path to navigate the vehicle 102 from source node 302 toward goal node 304. The parking path can, for example, be a parallel-parking maneuver or a back-in parking maneuver. As described above, the parking path algorithm can be a Hybrid A* variant of a Dijkstra-based algorithm.

At step 608, in response to a state of the parking path algorithm being greater than a threshold, an intermediate source node from among the positional nodes that is closest to the goal node is selected. For example, the parking path selector 118 can end the initial run of the parking path algorithm once the threshold is satisfied. In one implementation, the parking path algorithm is ended in response to a number of run-time iterations exceeding a predetermined integer value of the threshold. The predetermined integer value can be empirically determined for different types of parking maneuvers (e.g., parallel parking versus angle parking) for specific types or models of vehicles. In another implementation, the parking path algorithm is ended in response to one of the positional nodes of the first waypoints being within a predetermined distance of the goal node 304. In other words, the parking path selector can determine whether an inverse of a distance from a positional node to the goal node 304 is greater than a predetermined integer value.

The parking path selector 118 can select the intermediate source node as the positional node that is closest to the goal node by iterating through each positional node of the positional nodes stored in a priority queue of the parking path algorithm. For each positional node, the Euclidean distance from the positional node in the priority queue to the goal node 304 is determined. The parking path selector 118 then selects the positional node with the minimum Euclidean distance as the intermediate source node.

In response to the number of iterations of the parking path algorithm being less than the predetermined integer value and the parking path algorithm finding an optimal parking path from the source node 302 to the goal node 304, the assisted-driving system 210 or the autonomous-driving system 212 controls operation of the vehicle 102 to maneuver along the first waypoints to park in the selected parking space.

At step 610, second waypoints for the parking path from the intermediate source node to the goal node are determined using the parking path algorithm. For example, the parking path selector 118 reruns the parking path algorithm to obtain a series of positional nodes (e.g., the second waypoints) for the parking path to navigate the vehicle 102 from the intermediate source node to goal node 304. The second waypoints are appended to the first waypoints to generate the parking path for the assisted-driving system 210 or the autonomous-driving system 212.

In response to a second number of iterations of the parking path algorithm in its second running being greater than a second predetermined integer value for finding the parking path from the intermediate source node to the goal node 304, an indication that the parking path failed or was not determined is output to the assisted-driving system 210 or the autonomous-driving system 212. The failure indication can also be presented on a display in vehicle 102.

At step 612, the operation of the host vehicle is controlled using an assisted-driving or an autonomous-driving system to maneuver along the first waypoints and the second waypoints to park in the selected parking space. For example, the parking path selector 118 can output the first waypoints and second waypoints to the assisted-driving system 210 or the autonomous-driving system 212. The vehicle 102 can then be controlled using the assisted-driving system 210 or the autonomous-driving system 212 to perform the parking maneuver.

Examples

In the following section, examples are provided.

Example 1. A method comprising: obtaining an initial pose and a goal pose of a host vehicle, the initial pose comprising a source node for use in a parking path algorithm, the goal pose comprising a goal node for use in the parking path algorithm and indicating a parking pose of the host vehicle in a selected parking space; obtaining an obstacle map for an environment near the initial pose and the goal pose; determining, using the parking path algorithm and the obstacle map, first waypoints for a parking path, the first waypoints comprising a series of positional nodes for the parking path to navigate the host vehicle from the source node toward the goal node; in response to a state of the parking path algorithm being greater than a threshold, selecting an intermediate source node from among the positional nodes that is closest to the goal node; determining, using the parking path algorithm, second waypoints for the parking path from the intermediate source node to the goal node; and controlling, using an assisted-driving or an autonomous-driving system, operation of the host vehicle to maneuver along the first waypoints and the second waypoints to park in the selected parking space.

Example 2. The method of Example 1, wherein: the state of the parking path algorithm comprises a number of iterations of the parking path algorithm; and the threshold comprises a predetermined integer value.

Example 3. The method of Example 2, wherein the method further comprises: in response to the number of iterations of the parking path algorithm being less than the predetermined integer value and the parking path algorithm finding an optimal parking path from the source node to the goal node, controlling the operation of the host vehicle to maneuver along the first waypoints to park in the selected parking space using the assisted-driving or the autonomous-driving system.

Example 4. The method of Example 3, wherein the method further comprises: in response to a second number of iterations of the parking path algorithm being greater than a second predetermined integer value for finding the parking path from the intermediate source node to the goal node, outputting to the assisted-driving or the autonomous-driving system an indication that the parking path was not determined.

Example 5. The method of any one of the preceding Examples, wherein: the state of the parking path algorithm comprises an inverse of a distance from a positional node of the first waypoints to the goal node; and the threshold comprises a predetermined integer value.

Example 6. The method of any one of the preceding Examples, wherein the parking path algorithm comprises a variant of a Dijkstra-based algorithm for finding an optimal path from the source node to the goal node using non-holonomic constraints for the host vehicle.

Example 7. The method of Example 6, wherein the variant of the Dijkstra-based algorithm comprises a Hybrid A star (A*) algorithm.

Example 8. The method of Example 7, wherein selecting the intermediate source node from among the positional nodes that is closest to the goal node comprises: iterating through each positional node of the positional nodes stored in a priority queue of the parking path algorithm; determining a Euclidean distance from each positional node in the priority queue to the goal node; and selecting the positional node with a minimum of the Euclidean distance as the intermediate source node.

Example 9. The method of any one of the preceding Examples, wherein the second waypoints are appended to the first waypoints to generate the parking path for the assisted-driving or the autonomous-driving system.

Example 10. The method of any one of the preceding Examples, wherein: the initial pose is generated by a vehicle state estimator using location data; the goal pose is generated by a parking spot finder using the location data and other sensor data or map data; and the other sensor data includes data from at least one of a camera system, a radar system, a lidar system, or an ultrasonic sensor system.

Example 11. The method of any one of the preceding Examples, wherein the selected parking space is determined from user input on a display in the host vehicle or based on parking-space characteristics included in the obstacle map.

Example 12. The method of any one of the preceding Examples, wherein the obstacle map comprises a radar occupancy grid map or a radar-centric occupancy grid map for the environment.

Example 13. The method of any one of the preceding Examples, wherein the parking path comprises a parallel-parking maneuver or a back-in parking maneuver.

Example 14. A system comprising one or more processors configured to perform the method of any one of Examples 1 through 13.

Example 15. Computer-readable storage media comprising computer-executable instructions that, when executed, cause a processor to perform the method of any one of Examples 1 through 13.

Conclusion

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims.

What is claimed is:

1. A method comprising:
   obtaining an initial pose and a goal pose of a host vehicle, the initial pose comprising a source node for use in a parking path algorithm, the goal pose comprising a goal node for use in the parking path algorithm and indicating a parking pose of the host vehicle in a selected parking space;
   obtaining an obstacle map for an environment near the initial pose and the goal pose;
   determining, using the parking path algorithm and the obstacle map, first waypoints for a parking path, the first waypoints comprising a series of positional nodes for the parking path to navigate the host vehicle from the source node toward the goal node;
   in response to a state of the parking path algorithm being greater than a threshold, selecting an intermediate source node from among the positional nodes that is closest to the goal node;
   determining, using the parking path algorithm, second waypoints for the parking path from the intermediate source node to the goal node; and
   controlling, using an assisted-driving or an autonomous-driving system, operation of the host vehicle to maneuver along the first waypoints and the second waypoints to park in the selected parking space.

2. The method of claim 1, wherein:
   the state of the parking path algorithm comprises a number of iterations of the parking path algorithm; and
   the threshold comprises a predetermined integer value.

3. The method of claim 2, wherein the method further comprises:
   in response to the number of iterations of the parking path algorithm being less than the predetermined integer value and the parking path algorithm finding an optimal parking path from the source node to the goal node, controlling the operation of the host vehicle to maneuver along the first waypoints to park in the selected parking space using the assisted-driving or the autonomous-driving system.

4. The method of claim 3, wherein the method further comprises:

in response to a second number of iterations of the parking path algorithm being greater than a second predetermined integer value for finding the parking path from the intermediate source node to the goal node, outputting to the assisted-driving or the autonomous-driving system an indication that the parking path was not determined.

5. The method of claim 1, wherein:
the state of the parking path algorithm comprises an inverse of a distance from a positional node of the first waypoints to the goal node; and
the threshold comprises a predetermined integer value.

6. The method of claim 1, wherein the parking path algorithm comprises a variant of a Dijkstra-based algorithm for finding an optimal path from the source node to the goal node using non-holonomic constraints for the host vehicle.

7. The method of claim 6, wherein the variant of the Dijkstra-based algorithm comprises a Hybrid A star (A*) algorithm.

8. The method of claim 7, wherein selecting the intermediate source node from among the positional nodes that is closest to the goal node comprises:
iterating through each positional node of the positional nodes stored in a priority queue of the parking path algorithm;
determining a Euclidean distance from each positional node in the priority queue to the goal node; and
selecting the positional node with a minimum of the Euclidean distance as the intermediate source node.

9. The method of claim 1, wherein the second waypoints are appended to the first waypoints to generate the parking path for the assisted-driving or the autonomous-driving system.

10. The method of claim 1, wherein:
the initial pose is generated by a vehicle state estimator using location data;
the goal pose is generated by a parking spot finder using the location data and other sensor data or map data; and
the other sensor data includes data from at least one of a camera system, a radar system, a lidar system, or an ultrasonic sensor system.

11. The method of claim 1, wherein the selected parking space is determined from user input on a display in the host vehicle or based on parking-space characteristics included in the obstacle map.

12. The method of claim 1, wherein the obstacle map comprises a radar occupancy grid map or a radar-centric occupancy grid map for the environment.

13. The method of claim 1, wherein the parking path comprises a parallel-parking maneuver or a back-in parking maneuver.

14. A system comprising one or more processors configured to:
obtain an initial pose and a goal pose of a host vehicle, the initial pose comprising a source node for use in a parking path algorithm, the goal pose comprising a goal node for use in the parking path algorithm and indicating a parking pose of the host vehicle in a selected parking space;
obtain an obstacle map for an environment near the initial pose and the goal pose;
determine, using the parking path algorithm and the obstacle map, first waypoints for a parking path, the first waypoints comprising a series of positional nodes for the parking path to navigate the host vehicle from the source node toward the goal node;
in response to a state of the parking path algorithm being greater than a threshold, select an intermediate source node from among the positional nodes that is closest to the goal node;
determine, using the parking path algorithm, second waypoints for the parking path from the intermediate source node to the goal node; and
control, using an assisted-driving or an autonomous-driving system, operation of the host vehicle to maneuver along the first waypoints and the second waypoints to park in the selected parking space.

15. The system of claim 14, wherein:
the state of the parking path algorithm comprises a number of iterations of the parking path algorithm; and
the threshold comprises a predetermined integer value.

16. The system of claim 15, wherein the one or more processors are further configured to:
in response to the number of iterations of the parking path algorithm being less than the predetermined integer value and the parking path algorithm finding an optimal parking path from the source node to the goal node, control the operation of the host vehicle to maneuver along the first waypoints to park in the selected parking space using the assisted-driving or the autonomous-driving system.

17. The system of claim 16, wherein the one or more processors are further configured to:
in response to a second number of iterations of the parking path algorithm being greater than a second predetermined integer value for finding the parking path from the intermediate source node to the goal node, outputting to the assisted-driving or the autonomous-driving system an indication that the parking path was not determined.

18. The system of claim 14, wherein:
the state of the parking path algorithm comprises an inverse of a distance from a positional node of the first waypoints to the goal node; and
the threshold comprises a predetermined integer value.

19. The system of claim 14, wherein the parking path algorithm comprises a Hybrid A star (A*) variant of a Dijkstra-based algorithm for finding an optimal path from the source node to the goal node using non-holonomic constraints for the host vehicle.

20. Computer-readable storage media comprising computer-executable instructions that, when executed, cause a processor to:
obtain an initial pose and a goal pose of a host vehicle, the initial pose comprising a source node for use in a parking path algorithm, the goal pose comprising a goal node for use in the parking path algorithm and indicating a parking pose of the host vehicle in a selected parking space;
obtain an obstacle map for an environment near the initial pose and the goal pose;
determine, using the parking path algorithm and the obstacle map, first waypoints for a parking path, the first waypoints comprising a series of positional nodes for the parking path to navigate the host vehicle from the source node toward the goal node;
in response to a state of the parking path algorithm being greater than a threshold, select an intermediate source node from among the positional nodes that is closest to the goal node;
determine, using the parking path algorithm, second waypoints for the parking path from the intermediate source node to the goal node; and control, using an assisted-driving or an autonomous-driving system, operation of the host vehicle to maneuver along the first waypoints and the second waypoints to park in the selected parking space.

\* \* \* \* \*